$FIG-2$

United States Patent Office 3,321,303
Patented May 23, 1967

3,321,303
RECOVERY OF COPPER
Edward S. Roberts, Ridgewood, N.Y., assignor to The Treadwell Corporation, New York, N.Y., a corporation of New York
Filed Sept. 6, 1966, Ser. No. 577,502
25 Claims. (Cl. 75—106)

This application is in part a continuation of my copending application Serial No. 365,885, filed May 8, 1964, and now abandoned. The invention relates to methods of recovering copper from solutions containing copper salts. The invention is not concerned with the particular source of the solutions of copper salt. More particularly, the invention in a preferred modification deals with solutions of copper sulfate.

Typical solutions containing copper sulfate are leach liquors, which may be obtained, for example, by leaching oxidized copper ores or copper containing waste material with sulfuric acid solutions. Other sources are from mine waters, from the roasting and leaching of copper sulfide concentrates, or from the leaching of copper containing scrap.

The commonly used methods for extracting the copper from such solutions have been by electrolytic deposition of metallic copper and by precipitation of copper with iron. Both methods are subject to disadvantages and limitations.

Electrowinning recovers the copper in pure form but does not strip the solutions completely of their copper content. The copper in the bleed stream from an electrowinning plant is usually recovered by means other than electrolytic deposition. Another disadvantage of electrowinning is that the process is adversely affected by the presence of soluble iron compounds and other impurities.

The cementation of copper, i.e., precipitation of copper from solution with iron is commonly practiced to recover copper metal from dilute solutions as well as from discharged electrowinning liquors. The cement copper so recovered is not pure but may contain from 40% to 90% metallic copper. Another disadvantage of the cementation process is that the consumption of iron is usually 2 to 5 times the theoretical, thus increasing the cost of the copper metal recovered.

It is a principal object of the present invention to provide a process for recovering copper from aqueous solutions of copper sulfate or other copper salt and particularly the recovering of substantially pure copper at a cost which is economically attractive as compared with the economics of electrowinning and cementation techniques, and in most instances is economically advantageous as compared to conventional methods, such as the smelting of ores and concentrates and electro refining.

While in its preferred form the present invention is concerned with the recovery of copper from copper sulfate solutions, it is also applicable to other copper solutions, such as for example solutions of copper acetate. In general the anion associated with the copper is not particularly important so long as the acidic anion used and formed in the process does not dissolve or otherwise solubilize cuprous cyanide or react significantly with CuCN or HCN. For example, strongly oxidizing anions, such as nitrates, are undesirable.

It is another and more specific modification of this invention to provide a process for recovering copper using in one of its steps crude hydrogen cyanide, e.g., hydrogen cyanide burner gases produced by the Andrussow procedure (disclosed in United States Patent 1,934,838) to supply the HCN reactant for reacting with the copper sulfate.

In accordance with the invention, solutions may be used, such as leach liquors, containing copper salts, and particularly cupric sulfate, with or without other soluble metal sulfates, such as aluminum sulfate, ferric or ferrous sulfates and sometimes other soluble metal sulfates, such as nickel sulfate. Essentially the process of the present invention involves two steps, the first of which can in some cases be used alone where the product or part of it has independent utility. However, ordinarily the process will be used with both steps because it is normally desired to produce substantially pure copper as a final product. The second step involves the reduction of cuprous cyanide to metallic copper using hydrogen as a reducing agent. The steps may be represented by the following reaction mechanisms:

Step 1

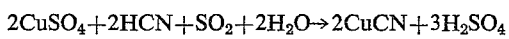
$$2CuSO_4 + 2HCN + SO_2 + 2H_2O \rightarrow 2CuCN + 3H_2SO_4$$

Alternate Step 1

$$CuSO_4 + 2HCN + Cu \rightarrow 2CuCN + H_2SO_4$$

Step 2

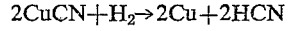
$$2CuCN + H_2 \rightarrow 2Cu + 2HCN$$

The first step involves precipitation of cuprous cyanide by reaction of HCN with the copper salt in acid solution, preferably an initial pH 0 to 4, in the presence of sufficient reducing material to reduce the copper present in the salt to the cuprous state. Normally the reducing material is present in the first step in substantial excess. The exact amount of excess is not particularly critical and in its broader aspects the invention is not limited to an exact amount. The cuprous cyanide has the unusual property of being extremely insoluble in sulfuric acid solution so that the recovery of the copper in this form in the first step approaches the theoretical. The insoluble cuprous cyanide ordinarily is precipitated in finely divided form and is recovered from the acid reaction mixture by known filtration or other separation means. The temperature at which the first step is carried out is not particularly critical, but in general will usually be below 100° C. The particular temperature to be used will vary somewhat with the reducing agent and pressure used, as will be discussed below, and may be as low as room temperature.

The second step involves reaction of the cuprous cyanide with hydrogen, which is preferably carried out at atmospheric pressure, though higher or lower pressures may be used, and the invention is not limited to any particular pressure. The reaction in the second step takes place at higher temperatures from 190° to 600° C. and preferably from 300° to 450° C. At the lower temperature limits the reaction is quite slow, and above 600° C. considerable decomposition of the HCN produced takes place. Between 300° and 450° the reaction proceeds with satisfactory speed and without economically significant decomposition of cyanide. The hydrogen should be employed in excess, preferably at least 50%, and the reaction produces substantially pure copper and HCN, which is recovered from the off gas.

It is desirable in the second step that the exit gas stream from the hydrogen reduction contain from 5 to 50% HCN, preferably 10% to 25%, the remainder being hydrogen or mixtures of hydrogen and other gases. The copper produced is substantially pure, 99.8% and better, and the yields are substantially quantitative in this step. The HCN produced is relatively pure HCN and is readily separated from the hydrogen.

A practically quantitative reaction to produce substantially pure copper and substantially pure HCN is unexpected and it is not known why under the conditions of the present invention in the second step this reaction takes place, and therefore the invention is not intended to be limited to any particular theory as to why the results take place. The reaction is all the more surprising because other metal cyanides do no react with hydrogen to give the substantially pure metal and substantially pure HCN in reasonably good yields at feasible reaction rates. For example, zinc cyanide when reacted with hydrogen at temperatures of 310°, 415° and 510° C. for 5, 5¼ and 7½ hours, respectively, did not produce an HCN, hydrogen mixture, but gave an exit gas which when dissolved in water which indicated decomposition HCN. The pH of the solution formed by dissolving in water the exit gas produced in the reduction of cuprous cyanide with hydrogen, in accordance with this invention, is 5. The reduction of Prussian blue $Fe_4(Fe(CN)_6)_3$ with hydrogen at temperatures of 485° and 560° C. for 4½ and 7¾ hours, respectively, gave an exit gas which on solution in water had a pH of 10. The reduction of sodium cyanide with hydrogen at 540° C. for 5½ hours produced only 2.5% of the theoretical amount of HCN which should have been liberated.

As has been pointed out above, a number of different reducing agents may be used in the first step provided they meet the requirements set out. However, under present economic conditions only two reducing agents are attractive, and in more specific aspects of the invention are included. These reducing agents are sulfur dioxide and recycled copper from the second step. From the standpoint of the first step it should not make any difference how the metallic copper used in this modification of the invention is obtained, but we have found that the recycled copper powder from the second step is unusually reactive and hence preferred. In some cases a different metal reducing agent, such as nickel, may be used. Any unreacted nickel will be present with the cuprous cyanide, and of course, in the subsequent second step a copper-nickel product is obtained with both metals in pure form. Therefore, the term substantially pure copper is intended to refer to the removal of impurities which were present in the original main source of the copper, such as for example leaching liquors.

The choice of reducing agent is dictated by the economics of the situation. Factors involved are the cost and availability of sulfur dioxide, the cost of hydrogen used in the second step, which is doubled when copper is recycled as the reducing agent, and the possibility of using the dilute impure sulfuric acid produced when $SO_2$ is used or its economical disposal.

The flexibility of the present invention from the standpoint of which major modification, as far as the choice of $SO_2$ or copper as a reducing agent is concerned, is one of the practical advantages of the present invention. Fortunately, the choice of which modification to use is not seriously affected by reaction efficiency, and so the choice of one or other of the preferred modifications of the present invention can be dictated entirely by the economic factors.

Since the copper sulfate solutions will usually contain the copper as cupric sulfate, the remainder of this application will describe the features of the invention in conjunction with this form, it being understood that in its broadest aspects the invention is not limited to $SO_4^=$ being the anion in the copper salt solution. The first step will be described in somewhat more detail in connection with the sulfur dioxide modification as the copper powder modification is sufficiently simple so that the description in specific examples is adequate. Also, since copper leach liquors constitute probably the most important single source of copper sulfate for use in the present invention, the general discussion of the sulfur dioxide modification for the first step will be in connection with such leach liquors.

The leach liquors, usually at least 0.5 gram copper per liter, are preferably from 1 to 50 grams of copper per liter. The amount of hydrogen cyanide employed is at least 60% of the stoichiometric amount required for the reaction; 60% to 800% or more of the stoichiometric amount of hydrogen cyanide required for the reaction can be used. The amount of sulfur dioxide employed is preferably at least the stoichiometric amount required for the reaction. A convenient method of operation is to maintain a substantially saturated solution with respect to $SO_2$. $SO_2$ may be consumed by reducible salts other then cupric sulfate. Thus when a leach solution contains ferric sulfate, an amount of sulfur dioxide is consumed equal to that required to reduce ferric sulfate to ferrous sulfate in accordance with the equation:

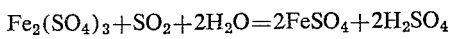

The reaction for cupric sulfate is shown by the following equation:

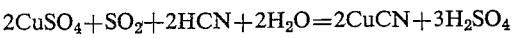

I have found that notwithstanding the presence of other soluble metal salts than the copper sulfate, the reaction proceeds readily under the conditions hereinabove disclosed to precipitate from 65% to 100% of the copper in the solution as cuprous cyanide; cuprous cyanide is obtained irrespective of whether the copper is present in the solution as cupric of cuprous sulfate.

The cuprous cyanide is separated from the reaction mixture, for example, by filtration, centrifugal separation, or other known separation techniques. This cuprous cyanide is substantially pure; surprisingly it is essentially iron-free even when produced in the presence of soluble iron salts. Cuprous cyanide can be used as such but has a limited market. Thus this invention provides a novel process of producing essentially pure cuprous cyanide from leach liquors containing cupric sulfate and impurities such as other soluble metal salts and particularly iron salts.

The invention will be described in greater detail in conjunction with the drawings, in which.

The invention will also be described in a number of specific examples in which the parts are by weight unless otherwise specified.

Figure 1:
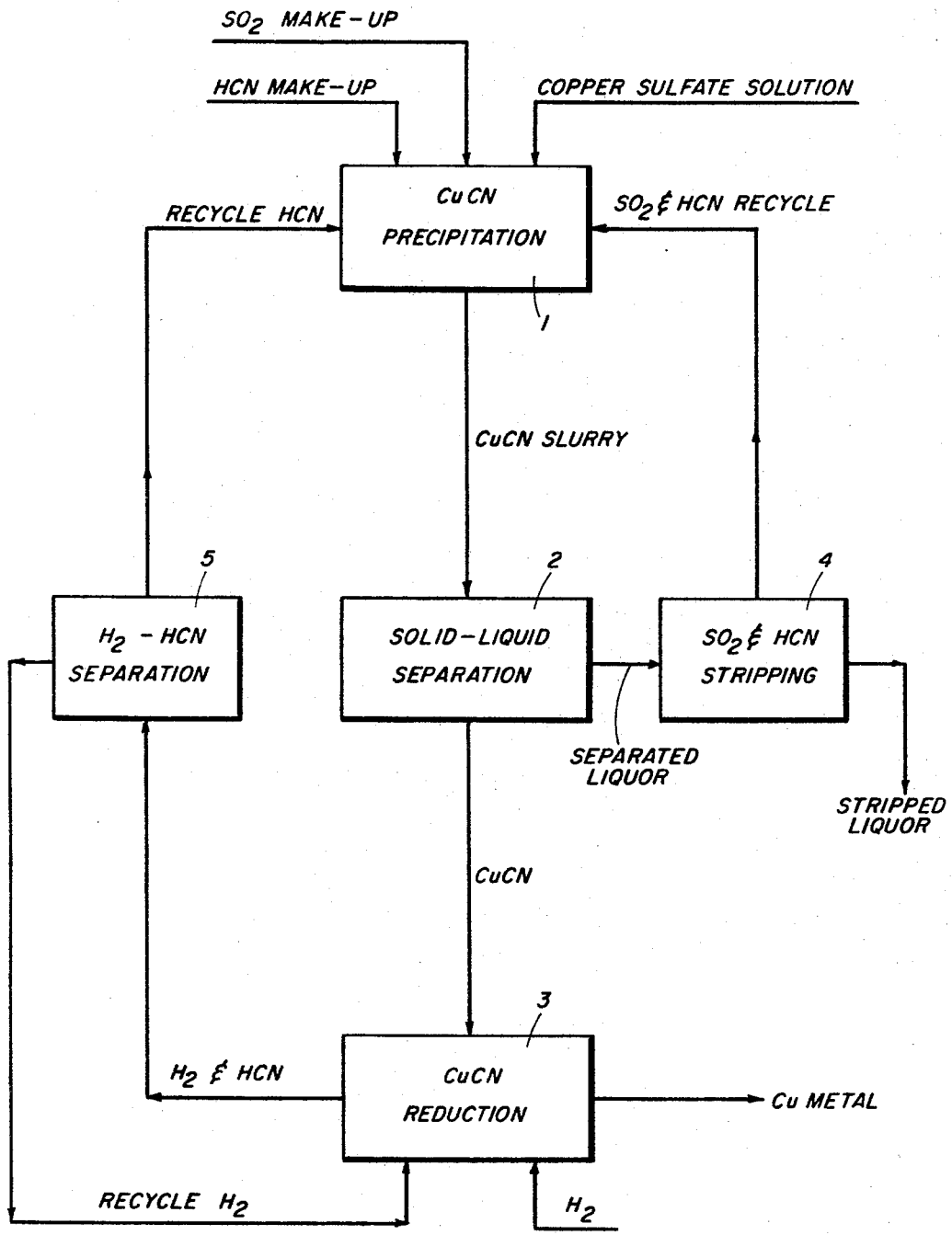
FIG. 1 is a flow sheet of a continuous process of producing pure copper using HCN and $SO_2$ in the first step.

Referring first to FIG. 1, which is a simplified flow sheet of the steps of the modification using $SO_2$ as a reducing agent in the CuCN precipitation step, it will be seen that the CuCN precipitation is represented at 1. Into this step is fed the copper sulfate solution, recycled HCN and $SO_2$, as will be described below, and make up $SO_2$ and HCN. The amounts are in line with the description above, the drawing being only a simplified flow sheet of the sequence of steps. In step 1 the copper from the copper sulfate solution is precipitated as cuprous cyanide in a finely divided form. As will be described in the examples to follow, the reaction can take place under various temperatures, a typical condition being ambient pressure conditions, temperature below 90° C. and pH below 7.

The cuprous cyanide slurry then passes to step 2 in which the solid cuprous cyanide is separated from the liquid by conventional means. The separated solids are then reduced to metallic copper in the reduction step 3, using hydrogen as a reducing agent as indicated. The temperatures and pressures are in accordance with the description above. The liquid separated, which contains dissolved $SO_2$ and HCN, is passed to the stripping step 4, where the $SO_2$ and HCN are stripped, for example by steam, and recycled to the cuprous cyanide precipitation step, as shown on the drawing. The stripped liquor, which is strongly acid with sulfuric acid, can be used in any manner desired, such as for example the leaching of copper bearing material.

In the cuprous cyanide reduction step 3 the hot hydrogen, carrying with it HCN formed, is passed into an $H_2$—HCN separation step 5. In this step the HCN may be absorbed in water, or any other well known means of separating the two materials may be employed. The HCN separated is then recycled to the cuprous cyanide precipitation 1, as shown on the drawing, and the hydrogen is then recycled, as shown, to the cuprous cyanide reduction step 3, of course with suitable heating of the hydrogen where it is desired to introduce part or all of the heat in the step in this manner. The metallic copper produced in step 3 is then recovered and constitutes the final product of the process.

Figure 2:
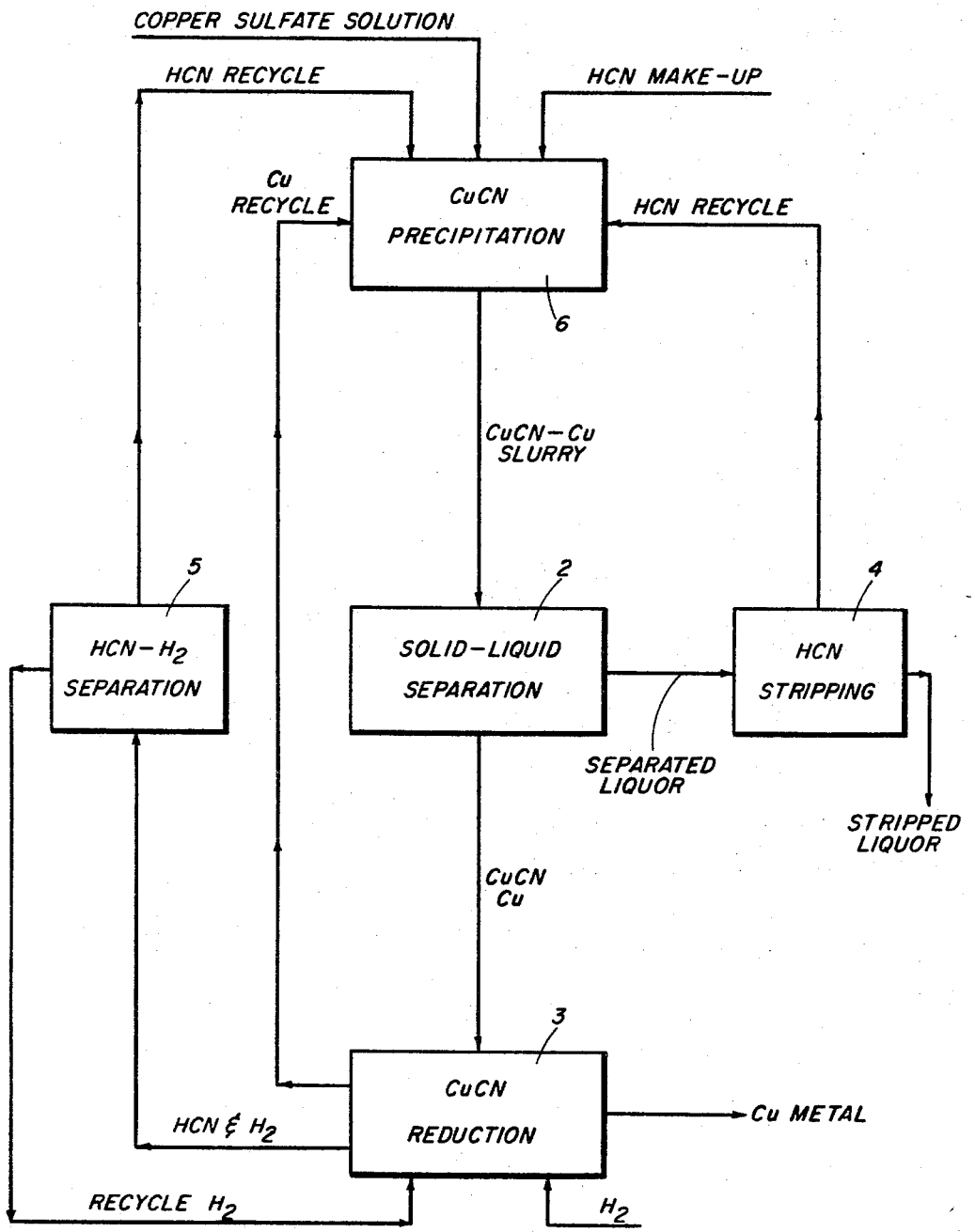
FIG. 2 is a similar flow sheet for a process of producing pure copper in which HCN and metallic copper are used in the first step.

The modification in which copper powder from the second step is used as the reducing agent in the first step is illustrated in FIG. 2, in which the elements common to the two figures are designated by the same reference numerals. It will be noted that apart from the fact that there is no $SO_2$ involved and that a portion of the copper powder from the CuCN reducing step 3 is recycled to the CuCN precipitation 6, the flow sheet is essentially similar, except of course that the amount of hydrogen makeup is considerably greater, for example about twice as much, as it is the extra hydrogen which produces the copper powder in the CuCN reduction step 3, which is recycled as the reducing agent in precipitation step 6.

It will be noted that FIG. 2 is essentially the same sequence of steps as FIG. 1, but because of the nature of the reducing agent in the precipitation step 6, a portion of the metallic copper from the cuprous cyanide reduction step 3 is recycled to step 6. The slurry entering the solid liquid separation step 2 of course contains both solid cuprous cyanide and excess metallic copper. Also, the liquid separated from step 2 and stripped in step 4 does not contain any $SO_2$.

Since the differences of the process using copper as the reducing agent in the cuprous cyanide precipitation step only involve changes in this step and in the separation and stripping steps 2 and 4, the examples which follow after the examples relating to the $SO_2$ reduction process will be described in conjunction with batch processes in which accurate quantitative yield determinations are more easily made. The reduction of the cuprous cyanide to metallic copper is exactly the same as in the modification using $SO_2$ as a reducing agent, except of course that the production of metallic copper is greater and provides the necessary amount for recycling into the cuprous cyanide precipitation step 6. In practice, of course, the modification just described would be used in an overall recovery process as represented by the flow sheet in FIG. 2.

In the processes represented both in FIG. 1 and FIG. 2, the metallic copper product is simply shown as such. The nature of the final product depends on what is desired. Thus the metallic copper may be used in powder form where this is desirable; it may be briquetted, extruded, or melted. It is an advantage of the present invention, however, that the metallic copper produced in the reduction, step 3 in either modification, is in a very highly reactive form, which is of direct advantage in the operation of the modification of the present invention represented by FIG. 2 where the copper powder is used as the reducing agent in the cuprous precipitation step 6. The high reactivity of the copper powder also is desirable where the powder is to be used in other processes where its fine division and high reactivity is desired. The high quality of the copper, not only its purity but its reactivity, often constitutes a practical advantage of the present invention. However, it should be realized that the copper produced can be used in any manner desired, and it might be considered that the invention stops when the copper metal is produced. This is reflected by FIGS. 1 to 3, which represent this copper as the final product of the invention.

Figure 3:
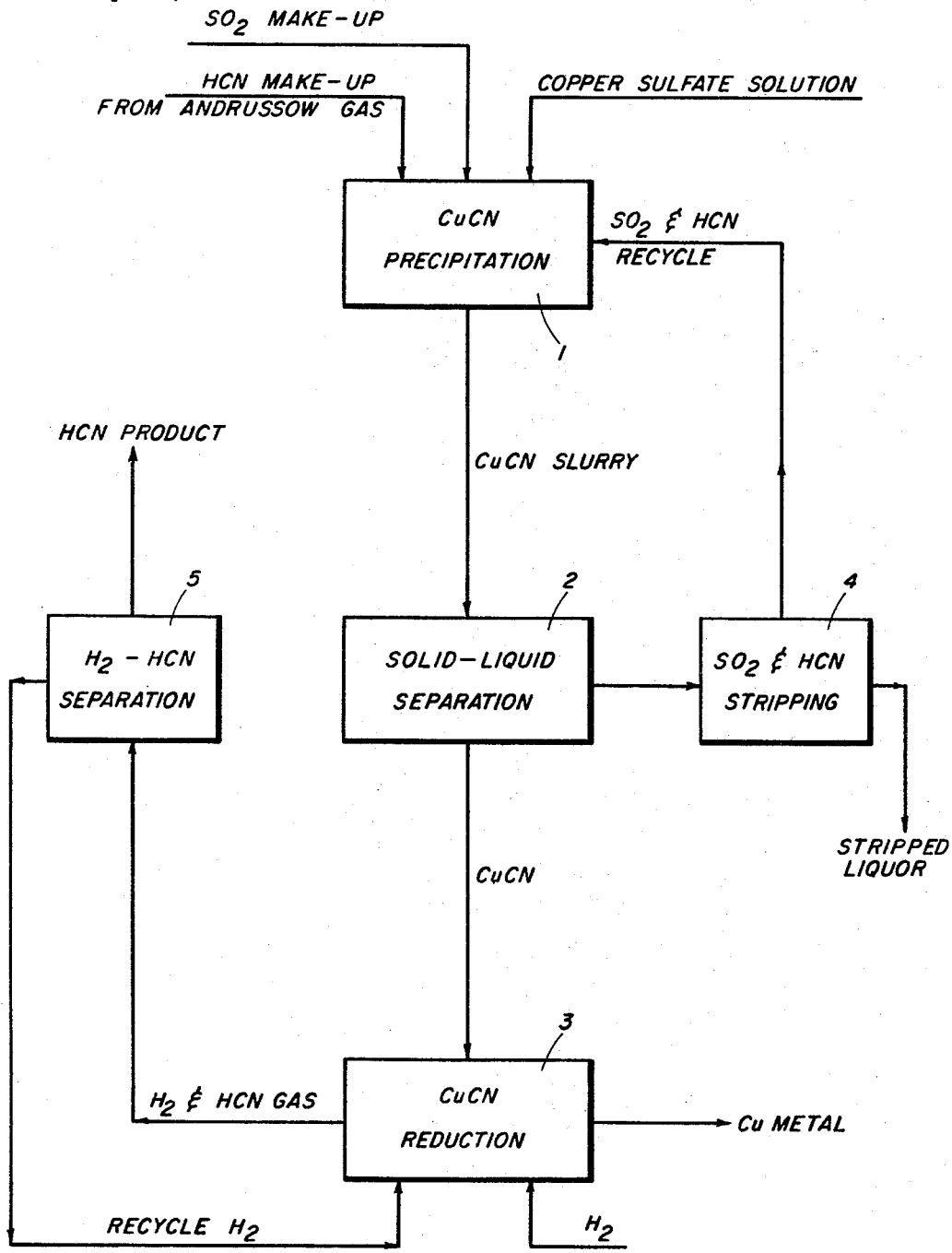
FIG. 3 is a similar flow sheet of a process using reaction gases from the Andrussow process in the first step.

FIG. 3 represents a flow sheet in which the HCN is produced from the Andrussow process. The steps themselves are the same as in FIG. 1, and therefore the different steps of cuprous cyanide precipitation, solid liquid separation, cuprous cyanide reduction, and the separation of hydrogen and HCN and stripping of $SO_2$ and HCN are shown in steps bearing the same reference numerals. There is, however, one modification because the dilute HCN introduced in step 1 finally is recovered from the $H_2$—HCN separation step 5 in the form of concentrated and relatively pure HCN, which is shown on FIG. 3 as a final product. This modification is useful where there is an economic demand at good price for pure HCN, as for example when the process of the present invention is carried out near locations where HCN is used, for example for fumigation. It will be noted that any ammonia present in the Andrussow gas will, of course, be transformed into ammonium sulfate, which will be present in the stripped liquor from the stripping step 4. Whether or not this ammonium sulfate is to be practically utilized is purely an economic matter, but it is an advantage of the present invention that where the economic conditions are favorable, this modification may be used. An example, VII, below, shows a practical operation of the process as shown in FIG. 3 utilizing the $SO_2$ modification for the cuprous cyanide precipitation step. Obviously, of course, the precipitation step can be carried out with metallic copper as the reducing agent.

The invention is not limited to any particular method of separating $H_2$ and HCN in the separation step 5 or the stripping of $SO_2$ and HCN in the stripping step 4. A typical separation at 5 is by absorption in water. As far as the stripping in 4 is concerned, steam stripping may be used.

The same typical methods may be used in FIG. 1 for separating $H_2$ and HCN and for stripping, but in this case the stripping will strip both HCN and $SO_2$.

EXAMPLE I

To a 5-liter, 3-neck flask, 3 liters of leach liquor obtained from a heap leaching installation was introduced. This leach liquor contained 1.93 grams of copper per liter of solution; the 3 liters thus contained 5.79 grams of copper or 0.091 gram-mols. This leach liquor solution was heated to a temperature of 50° C. and while at this temperature, 90 cc. of distilled water saturated at 16° C. with $SO_2$ containing 13.05 grams $SO_2$ per 100 cc. water were added to the solution. Thus 0.183 gram-mols of $SO_2$ were added. This corresponds to 400% of the stoichiometric requirement of $SO_2$ for the reaction, i.e., the excess over and above the stoichiometric amount was 300%. Upon addition of the $SO_2$ the solution changed immediately from brown to green, indicating reduction of the ferric ion in solution to ferrous ion and the cupric ion to cuprous ion. Thereupon 72 cc. of distilled water containing 1.268 gram-mols of HCN per liter of solution were added. Thus 0.091 gram-mols of HCN were added. This corresponds to 100% of the stoichiometric amount of HCN required for the reaction.

Upon addition of the HCN precipitation of cuprous cyanide began immediately. The reaction mixture was agitated for three hours and then filtered hot (about 50° C.). The cuprous cyanide precipitate was dried and weighed. 5.9 grams (0.0659 gram-mols) of cuprous cyanide precipitate was thus obtained. This represents a recovery of 72.4% of the copper content of the leach liquor.

EXAMPLE II

This example, like Example I, involves the precipitation of cuprous cyanide from a solution containing cupric sulfate. To each of three flasks (identified as A, B and C) were added 127 grams of cupric sulfate

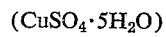

and 19 liters of distilled water. 320 cc. of distilled water saturated with $SO_2$ at 22° C., thus containing 10.5 grams of $SO_2$ per 100 cc. of water, were added to each solution. The amount of $SO_2$ in the reaction mixture was 0.525 gram-mol. The amount of copper present was 0.508 gram-mol. Since 0.5 gram-mol of $SO_2$ are required for each gram-mol of copper, the amount used is about 206% of the stoichiometric amount theoretically required.

To this reaction mixture was added different amounts of HCN as follows. In each case a distilled water solution containing 1.065 gram-mols of HCN, (28.7 grams), per liter of reaction mixture were added. To reaction mixture A was added 650 cc. equivalent to 136% of the stoichiometric amount of HCN required for the reaction. To reaction mixture B was added 480 cc. equivalent to 100% of the stoichiometric amount required for the reaction. To reaction mixture C was added 360 cc. equivalent to 75% of the stoichiometric amount required for the reaction. These reaction mixtures were permitted to stand over night and filtered the following morning. The precipitate was then dried and weighed. The results were as follows:

TABLE

| Reaction Mixture | Copper Cyanide Precipitate | | Percent Yield Based on Copper | Percent Yield Based on HCN |
|---|---|---|---|---|
| | Gram | Gram-Mols | | |
| A | 37.2 | 0.416 | 82.0 | 61.0 |
| B | 32.1 | 0.359 | 70.6 | 70.6 |
| C | 28.1 | 0.314 | 62.0 | 82.6 |

EXAMPLE III

This example involved the treatment of three synthetic leach liquors A, B and C. Leach liquor A contained 127 grams of cupric sulfate ($CuSO_4 \cdot 5H_2O$), 5.9 grams of ferric sulfate ($FeSO_4 \cdot 7H_2O$) and 31.3 grams aluminum sulfate ($Al_2(SO_4)_3 \cdot 18H_2O$) in 19 liters of distilled water. Leach liquor B contained double the amount of each of these three sulfates in 19 liters of distilled water. Leach liquor C contained four times the amount of each of these three sulfates in 19 liters of distilled water. To each of these three leach liquors was added 200% of the stoichiometric amount of sulfur dioxide and 100% of the stoichiometric amount of HCN required for the reaction to proceed to form cuprous cyanide and sulfuric acid. The reaction mixtures were allowed to stand over night and filtered the following morning. The precipitates thus obtained were dried and weighed. The results are given in the table which follows:

TABLE

| Leach Liquor Solution | Copper Concentration, grams per liter | CuCN ppt., Grams | Percent Yield Based on Cu |
|---|---|---|---|
| A | 1.615 | 32.7 | 72.0 |
| B | 3.230 | 68.7 | 75.6 |
| C | 6.460 | 138.3 | 76.3 |

The precipitated cuprous cyanide was substantially uncontaminated with iron and/or aluminum; analysis of a sample showed iron about 0.05%, aluminum below 0.5% and the sum total of all impurities less than 1%. This example demonstrates that the cuprous cyanide can be precipitated in the presence of other soluble metal sulfates by the process of this invention without substantial contamination with these other metals.

EXAMPLE IV

This example involves the recovery of cuprous cyanide from a solution containing 3.830 liters of water, 25.4 grams of cupric sulfate ($CuSO_4 \cdot 5H_2O$), 1.2 grams of ferric sulfate ($FeSO_4 \cdot 7H_2O$) and 12.5 grams of aluminum sulfate ($Al_2(SO_4)_3 \cdot 18H_2O$). This solution was introduced into a 5-liter 3-neck round bottom flask and was constantly agitated. Nitrogen was passed through the solution to purge it and thereafter 100 cc. of distilled water saturated with $SO_2$ at 25° C. containing 9.41 grams of $SO_2$ were added to the solution while agitating it. This represents 342% of the theoretical $SO_2$ requirement for the reaction. Upon completion of the addition of the $SO_2$, 70 cc. of a distilled water solution containing 36.45 grams of HCN per liter of solution were added. This represents 93% of the theoretical requirement of HCN for the reaction. The solution was left to stand over night and filtered in the morning. The precipitate was dried and weighed. There was thus obtained a yield of cuprous cyanide of 62% based on the copper content of the solution and 66% based on the HCN introduced into the solution.

EXAMPLE V 196.5 grams of cupric sulfate and 340 grams of aluminum sulfate were added to 0.975 liter of distilled water in a 5-liter 3-neck round bottom flask. Nitrogen was passed through this solution and thereafter while constantly agitating the solution was added thereto 500 cc. of distilled water saturated with $SO_2$ at 25° C. containing 9.41 grams of $SO_2$ per 100 cc. of water and following the $SO_2$ addition 0.525 liter of distilled water containing 39.2 grams of HCN per liter of solution. The amount of $SO_2$ thus added was 221% of the theoretical requirement. The amount of HCN was 96.8% of the theoretical requirement. The solution was left to stand over night and filtered in the morning. The precipitate was dried and weighed. There was thus obtained cuprous cyanide in a yield of 71.6% based on the copper; 73.8% based on the HCN added to the solution. Upon analysis the precipitate was found to be aluminum free.

EXAMPLE VI

This example differs from Example V in that the solution contained nickel sulfate ($NiSO_4 \cdot 6H_2O$) in addition to the aluminum sulfate and the cupric sulfate. The amount of nickel sulfate added contained approximately 2.0 grams of nickel per liter.

The yield of cuprous cyanide was substantially the same and upon analysis the cuprous cyanide was found to be free of aluminum and nickel impurities.

EXAMPLE VII

This example involves the use of the reaction gases from the Andrussow process to supply the HCN for reaction along with $SO_2$ with the cupric sulfate in the leach liquor. The Andrussow burner gas used has the following analysis:

| | Gram-mols |
|---|---|
| HCN | 500 |
| $N_2$ | 3870 |
| $NH_3$ | 183 |
| $H_2O$ | 1525 |
| $CO_2$ | 91 |
| CO | 346 |
| $H_2$ | 957 |

These gases along with 500 gram-mols of additional HCN and 500 gram-mols of $SO_2$ are passed through 6320 liters of sulfuric acid leach solution containing 5 grams of copper as cuprous sulfate per liter. Thus the total copper in the leach solution is 31,750 grams or 500 gram-mols. Hence 100% of the stoichiometric amount of HCN and 200% of the stoichiometric amount of $SO_2$ required for reaction with the cupric sulfate is passed into the leach solution. The reaction is carried out under ambient temperature and pressure conditions. The precipitate is separated from the filtrate in a centrifugal separator. There is thus obtained 356 gram-mols of cuprous cyanide precipitate and a filtrate containing 144 gram-mols of copper. The precipitate represents a 71% recovery of the copper in the leach liquor solution.

The cuprous cyanide precipitate is fed into a reduction furnace. 1228 gram-mols of hydrogen are fed to this reduction furnace; there is removed from this reduction furnace an effluent gas containing 25% HCN and 75% $H_2$. This hydrogen is separated from the HCN by scrubbing with water to dissolve the HCN. The HCN solution thus produced can be heated to drive off pure HCN which can be sold as such or recycled to the cuprous cyanide precipitator for reaction with the cupric of cuprous sulfate and $SO_2$ to produce cuprous cyanide. 356 gram-mols of copper and 350 gram-mols of HCN are thus obtained.

EXAMPLE VIII

This example is a preferred exemplification of the reduction of the cuprous cyanide with hydrogen to produce pure copper and HCN.

18.75 grams (0.209 gram-mols) of cuprous cyanide were placed in two alundum boats each 5 inches long and ¾ inch wide. These boats were placed in a 1-inch I.D. zirconium silicate tube and the later placed in a furnace heating the alundum boats to a temperature of 400° C. 144 liters of hydrogen per hour were passed through the tube over the cuprous cyanide and the exit gas containing hydrogen and HCN passed through two bubblers. The first bubbler contained 51.0 grams (0.30 gram-mols) of silver nitrate in 1250 cc. distilled water. The second bubbler contained 10.0 grams (0.246 gram-mols) of sodium hydroxide in 500 cc. of distilled water. The effluent gas from the second bubbler was passed through a Precision Scientific Wet Test Meter and the gas exiting from the meter was burned. The two bubblers containing respectively silver nitrate and sodium hydroxide were used because this is a standard method for separating hydrogen cyanide (HCN) and cyanogen ($C_2N_2$) as described in "Cyanogen Compounds," by H. E. Williams, 2nd edition, 1948, page 343. Hydrogen cyanide reacts with the silver nitrate to form silver cyanide. Cyanogen will not react with silver nitrate but it is hydrolyzed by the sodium hydroxide according to the reaction:

$$2NaOH + (CN)_2 = NaCN + NaCNO + H_2O$$

Thus by analyzing the solutions in the two bubblers a determination of the cyanogen and HCN content of the exit gas from the cuprous cyanide reducer can be made.

Analysis of the solutions in the two bubblers showed 98.5% yield of pure HCN in this example.

EXAMPLE IX 50 grams of cuprous cyanide (0.558 gram-mol) were placed in a 25 mm. I.D. Vycor tube between glass wool positioned on opposite sides of the cuprous cyanide to contain it within the tube. A stream of hydrogen was passed continuously through the cuprous cyanide in the tube. The tube was heated to a temperature of 300° C. and maintained at this temperature for one hour during the passage of the hydrogen therethrough. Hydrogen was passed through the tube during this one hour period at the flow rates hereinbelow given. The exit gas from the tube was passed in series through two bubblers, the first containing 102 grams (0.6 gram-mols) of silver nitrate dissolved in a liter of distilled water containing 1 cc. of concentrated nitric acid, and the second bubbler containing 500 cc. of 1.0 normal sodium hydroxide. The effluent from the second bubbler was passed through a Precision Scientific Wet Test Meter.

The contents of the bubblers were analyzed. The results are given in the table which follows:

| Hydrogen Flow Rate, liters/hr. | Percent Yield HCN | Percent $H_2$ by Volume in $H_2$—HCN Effluent |
| --- | --- | --- |
| 6.2 | 70.6 | 33.0 |
| 17.3 | 90.6 | 47.4 |
| 28.3 | 95.0 | 64.0 |

Example IX demonstrates the marked and surprising improvement in yield obtained when the hydrogen flow rate is such that at least about 50% by volume of hydrogen is in the hydrogen HCN effluent exiting from the cuprous cyanide reducer. It will be noted that when the volume of hydrogen in this exit stream is 33.0% the yield of HCN is 70.6%; when the volume of $H_2$ in this exit stream is 47.4%, i.e., about 50% or more, the yield of HCN is in excess of 90%. The yield of copper is essentially 100%.

EXAMPLE X

This example describes the use of somewhat lower temperatures in the reduction step of CuCN and a fluidized bed type of equipment. The reducer consisted of a 10 foot length of 4 inch stainless steel pipe. The pipe was mounted vertically and was wrapped with chromel heating wire. Separate temperature controls were provided for every foot of pipe and the heating layer was then covered with two inches insulation wrapped around the outside of the wires, there was also a thin wrapping of asbestos paper between the heating wire and pipe to prevent short circuiting. Ten internal thermocouples were placed, one per foot, located in the center of the pipe and ten external thermocouples welded to the outer wall of the pipe. The CuCN rested on a 400 mesh stainless steel supporting screen.

Hydrogen was passed through a preheater and then into the bottom of the tube, up through the CuCN bed and then out into an empty bottle and then a flask. During the periods when gas samples were taken for analysis the exit gas passed through the empty bottle then through a sulfuric acid bubbler to collect amines, then through a silver nitrate bubbler to collect HCN, and finally through a bubbler containing an aqueous caustic alkali solution to collect cyanogen. Finally the off gases passed through a flow meter to measure the hydrogen flow rate.

The bed depth of CuCN was 4.67 feet. Only trace quantities of amines were formed and the average composition of the exit gas was 9.84% HCN and 90.16% $H_2$. The CuCN was dry and weighted 19.93 lbs. Hydrogen velocity from the start of the reduction for the first 2.5 hrs. was 0.69 ft./sec., then from 2.5 hrs. to 4.5 hrs. the hydrogen rate was increased to 0.895 ft./sec. The hydrogen temperature at the start was 215° C., at 2.5 hrs. 260° C. and this temperature was maintained until the end. The preliminary heating of the bed to 215° C. was with hot dry nitrogen. Complete reduction of the CuCN took 4.5 hrs. and at the estimated peak period of reaction the exit gas showed slight traces of amines and cyanogen, 14.76% HCN and 85.24% of $H_2$.

It will be noted that at the lower temperatures the reduction proceeded to completion though at a somewhat lower rate. There was no substantial decomposition of the HCN as amines and cyanogen were produced only in traces.

EXAMPLE XI 5 liters of a sulfuric acid leach liquor containing 1.93 grams of copper as cupric sulfate per liter was mixed with 150 ml. of water saturated with $SO_2$ at 16° C. and 180 ml. of water containing 1.268 gram-mols of HCN per liter. Thus the mixture contained 0.152 gram-mols of copper, 0.304 gram-mols of $SO_2$ and 0.228 gram-mols of HCN. This mixture was agitated and allowed to stand for 48 hours. The supernatant liquid was decanted into another container. The precipitate cuprous cyanide thus recovered was dried and weighed. 10.2 grams of cuprous cyanide were thus obtained; this corresponds to a yield of 75% based on the weight of the copper.

2100 ml. of the supernatant liquid was filtered to remove any residual particles of cuprous cyanide. The solution thus obtained as filtrate was placed in a 3-liter glass vessel 20 inches high, having a 4 inch diameter, and having therein baffles spaced 2 inches apart. The glass vessel was equipped with an agitator. 500 liters per hour of air was bubbled through this vessel over a 24-hour period. The air stream leaving the vessel was passed through two traps, in series, each containing 500 ml. of 1 N sodium hydroxide. The original supernatant liquid, the liquid remaining in the vessel through which the air had been bubbled and the contents of each trap were analyzed for HCN. The original supernatant liquid contained 0.480 gram of HCN per liter. After aeration, as hereinabove described, the liquid contained 0.0013 gram of HCN per liter. The sodium hydroxide solution in the first trap contained 0.974 gram of HCN; that in the second trap contained .043 gram of HCN; thus the total HCN in both traps was 1.017 grams.

In this example, as noted, 0.228 gram mol of HCN was used to precipitate the copper as cuprous cyanide from the sulfuric acid leach liquor. Of this HCN 0.114 gram-mols was in the cuprous cyanide precipitate and 0.114 gram-mols remained in solution, i.e., in the supernatant sulfuric acid solution containing HCN separated from the cuprous cyanide precipitate. Substantially all of this HCN was recovered by blowing this solution with an inert gas. The blowing of the supernatant liquid with an inert gas to effect the removal of the HCN has been effected to the point of producing residual liquid containing as little as 1.3 parts per million of HCN.

EXAMPLE XII

A solution containing 5 gm./liter copper, as copper sulfate, was saturated with $SO_2$ at 90° C. and 1 atmosphere pressure. The solution also contained 2 gm./liter sulfuric acid. The copper sulfate was first dissolved in water, the additional sulfuric acid added, and the whole heated to 90° C. and saturated with the $SO_2$ at 1 atmosphere. The flask containing the solution was evacuated. HCN, with such additional $SO_2$ as required to maintain the 1 atmosphere pressure, was introduced. The amount of HCN was 3.7 times the stoichiometrical quantity. Stirring proceeded as in other examples, and the reaction proceeded rapidly, all color of copper sulfate disappearing within 20 minutes. The temperature during the reaction maintained not below 87–88° C.

It will be apparent from the above example that the precipitation of cuprous cyanide proceeded even at temperatures as high as about 90° C. The reaction was substantially quantitative, but as this is also true of the examples in which somewhat lower temperatures were used, in practical operation such lower temperatures are often preferred.

EXAMPLE XIII

An aqueous solution of copper acetate, 5 gm./liter of copper and 2 gm./liter of $H_2SO_4$ was used as the raw material. The copper acetate, with 1 mol. of water of crystallization, was dissolved in water and the sulfuric acid added. The mixture was then heated to 90° C., placed in an evacuated vessel, and HCN added in amount 4 times stoichiometrical. $SO_2$ was then introduced until the solution turned water white, which occurred within 50 minutes. The amount of $SO_2$ corresponded to saturation at 1 atmosphere.

As the copper acetate, with excess sulfuric acid, was heated up, at first a green precipitate formed at about 60° C. This precipitate, however, immediately disappeared upon the addition of HCN, and all of the final precipitate was cuprous cyanide. It took approximately 50 minutes for all of the copper to be thus precipitated. The cuprous cyanide was then separated by filtration, as in preceding examples, and reduced with hydrogen as has been described above. The reaction mechanism is as follows:

$$2Cu(C_2H_3O_2)_2 + SO_2 + 2HCN + 2H_2O = 2CuCN + H_2SO_4 = 4HC_2H_3O_2$$

EXAMPLE XIV

To a copper sulfate solution containing 50 gms. of copper at a concentration of about 25 gms./liter of copper, $H_2SO_4$, 30.9 gms./liter, 5 gms./liter Fe as ferrous sulfate and 5 gms./liter Ni as nickel sulfate, there was added 95 gms. of finely divided copper powder. This copper was produced by reduction from briquetted CuCN which was reduced by hydrogen and comminuted with a mortar and pestle. The reaction mixture was saturated with HCN maintained under a total pressure of 1 atmosphere. The temperature was 90° C., and thorough and continuous mixing was maintained. In order to determine the rate at which the reaction proceeded, small samples were taken at various times. The HCN atmosphere was maintained by periodic additions of HCN as required to maintain the pressure. The HCN can be derived from the reduction of cuprous cyanide with hydrogen at 350° C. The analyses of the samples appear in the following table:

| Hours | Residual Cu (gms./liter) | Percent Yield Cu (Based on solution analysis) |
|---|---|---|
| 0.00 | 26.144 | 0.00 |
| 0.33 | 24.170 | 7.50 |
| 0.50 | 17.370 | 33.50 |
| 1.00 | 0.033 | 99.87 |
| 1.50 | 0.011 | 99.95 |

It will be noted that at the end of 1½ hours the cuprous cyanide precipitation was almost quantitative, the remaining copper in the solution being at a concentration of only about 0.01 gm./liter. The CuCN was essentially pure.

EXAMPLE XV

The procedure of Example XIV was repeated but the temperature was maintained at 50° C. and the sampling times were slightly different. It will be obvious that since the HCN atmosphere was the same, there was a somewhat higher concentration of HCN in the actual reaction mixture. As a result, reaction rates were somewhat higher than in the preceding example, an indication that at these temperatures HCN concentration had a somewhat greater effect than temperature. The results of the samplings appear in the following table:

| Hours | Residual Cu (gms./liter) | Percent Yield Cu (Based on solution analysis) |
|---|---|---|
| 0.00 | 25.37 | 0.00 |
| 0.167 | 19.91 | 21.20 |
| 0.33 | 9.13 | 64.00 |
| 0.50 | 4.70 | 81.40 |
| 1.00 | 0.011 | 99.95 |

EXAMPLE XVI

This example repeated the procedure of the two preceding examples, but at 40° C. the results of the samplings appear in the following table:

| Hours | Residual Cu (gms./liter) | Percent Yield Cu (Based on solution analysis) |
|---|---|---|
| 0.00 | 26.38 | 0.00 |
| 0.167 | 23.32 | 11.30 |
| 0.33 | 12.23 | 53.40 |
| 0.50 | 4.62 | 82.50 |
| 1.00 | 0.03 | 99.89 |
| 1.25 | 0.003 | 99.99 |

EXAMPLE XVII

The procedure of the preceding examples was repeated at a temperature of 30° C., and the results appear in the following table:

| Hours | Residual Cu (gms./liter) | Percent Yield Cu (Based on solution analysis) |
|---|---|---|
| 0.00 | 25.04 | 0.00 |
| 0.167 | 17.20 | 31.20 |
| 0.33 | 12.81 | 48.80 |
| 0.50 | 4.27 | 83.00 |
| 1.00 | 0.023 | 99.91 |
| 1.25 | 0.008 | 99.99 |

From the preceding examples it will be apparent that the precipitation of cuprous cyanide takes place over quite a wide range of temperatures with comparable efficiency. This is of importance in practical operations.

EXAMPLE XVIII

This example, which used in general the conditions of Example XIV, was elaborated to determine HCN losses:

Step A

Copper sulfate was dissolved in water and the sulfuric acid added. 500 cc. of this solution was placed in a 1-liter 3-neck flask fitted with a reflux condenser, and HCN addition burette, and a tube for introducing $N_2$. The top of the reflux condenser was connected to a mercury manometer and a vent. 23.8 gms. of copper powder produced by reducing cuprous cyanide with hydrogen and 350° C. were added to the solution, which was heated up to 90° C. The vent was closed and 17.8 gms. of HCN were added slowly to the solution, maintaining a positive pressure of not over two inches of Hg. The solution was kept at 90° C. for one hour, then $N_2$ was introduced into the system through the inlet tube and the effluent coming off the top of the reflux condenser was passed first through a bubbler containing 136.0 gms. of $AgNO_3$ (and two drops of $HNO_3$), then through a bubbler containing KOH. The solution was brought to a boil and kept at boiling for 3 hours. Each bubbler was analyzed for HCN. The solution was filtered, and the ppt. was washed on the filter, dried, and weighed.

Step B

The dried ppt. was briquetted, weighed, then reduced with $H_2$ at 300° C. The effluent gas from the reducing furnace was passed first through a bubbler containing 85.0 gms. of $AgNO_3$ (and two drops of $HNO_3$), then through a bubbler containing KOH. Each bubbler was analyzed for HCN, and the reduced copper was weighed.

RESULTS

A—Precipitation:
 Bubbler #1 HCN=6.9 gms.=0.254 gm.-moles
 Bubbler #2 HCN=0.01 gms. Negligible
 Note.—This bubbler indicates cyanogen.
 Weight of dried ppt.=49.9 gms.
 Notes.—(1) There was a small leak for approximately 30 seconds when blowing with $N_2$. This loss though is considered small. (2) Accuracy in weighing ±0.1 gm.

B—Reduction:
 Weight of ppt. reduced=49.5 gms.
 Weight of Cu after reduction=39.7 gms.
 Bubbler #1 HCN=9.9 gms.=0.366 gm.-moles
 Bubbler #2 HCN=0.03 gms. Negligible
 Note.—This bubbler indicates cyanogen.

The weight lost by the ppt. during reduction matched the HCN collected. This would indicate that essentially all of the HCN lost was lost during the precipitation step, probably through undetected leaks or incomplete purging.

Total cyanogen formed, as indicated by weight of HCN in bubbler:

|  | Gm. |
|---|---|
| Precipitation | 0.1 |
| Reduction | 0.03 |
| Total found | 0.04 |

This is equivalent to one-half of the actual HCN loss as $(CN)_2$, i.e., 0.08 gm., or less than 0.5% of the HCN used.

HCN Balance:
 (1) HCN added 17.8 gms.=0.659 gm.-moles
 (2) HCN recovered:

|  | Gms. | Gm.-moles |
|---|---|---|
| (a) Precipitation | 6.9 | 0.254 |
| (b) Reduction [1] | 9.9 | 0.369 |
| Total | 16.8 | 0.623 |

[1] Corrected for 49.9 gms. ppt. formed and only 49.5 gms. reduced.

Percent HCN recovered=94.5% gms. HCN lost/gm. Cu ppt.=0.08

It will be apparent that there was negligible decomposition of HCN to cyanogen and that the losses occurred all in the precipitation step. As the operation was on a laboratory scale, it is pointed out that the HCN lost is a maximum and that large scale operations, in which leaking and purging are not important, would show at least as good HCN recoveries.

EXAMPLE XIX

The procedure of Example XIV was repeated, but instead of using copper powder as a reducing agent, 1 lb. of dextrose was added to 1 liter of the acid cupric sulfate solution and then HCN added to the blue solution. A good yield of cuprous cyanide was obtained, but it was not as nearly quantitative as when copper powder was employed.

As in the first eleven examples, unprecipitated copper is recycled and so not lost. Pure sugars do not represent attractive reducing agents from the cost standpoint, but in exceptional situations where byproduct reducing sugar wastee is available at negligible cost, the process can be used. In most cases, however, the economics favor either the use of recycled copper or $SO_2$ as the reducing agent, and therefore these two modifications of the invention constitute the prefered modifications, although the invention broadly is not limited thereto and includes other reducing agents.

EXAMPLE XX

This example, which is similar to Example XIII, shows the use of metallic copper as a reducing agent instead of $SO_2$. The reaction is as follows:

$$Cu(C_2H_3O_2)_2 + Cu + 2HCN = 2CuCN + 2HC_2H_3O_2$$

The copper acetate with 1 mole of water of crystallization was dissolved in water to form a 5 gm./liter solution, and acetic acid added in the amount of 2 gm./liter. The copper powder in the amount of 3 mols per mole of copper acetate was then added and the reaction mixture heated up to 90° C. and the flask was evacuated. HCN was then added until the solution turned water white, the amount of HCN being 1.3 times stoichiometric. This took about 4 minutes and resulted in precipitating the copper as cuprous cyanide.

EXAMPLE XXI

A series of nine examples were carried out to compare the efficiency as a reducing agent of different forms of metallic copper. The copper sulfate solution for each of the nine modifications had a concentration of 45 gm./liter of copper with 1 gm./liter of additional sulfuric acid. The differences were in the nature and amounts of copper powder used. In each case the temperature was 40° C., the general procedure being to dissolve the copper sulfate in water, add the additional sulfuric acid and the copper powder, heat to 40° C., evacuate the flask, and add about 1.25 times stoichiometric of HCN this addition taking approximately 35 minutes. The nine variants will be labeled A to I.

A. The copper powder was obtained by reducing cuprous cyanide briquettes, containing Cu, with hydrogen and then grinding in a mortar and pestle. The amount of copper powder added was 3 mol per mol $CuSO_4$. As the HCN was added the solution became lighter and lighter blue and after the HCN addition was complete the solution was water white, all of the copper being precipitated. It should be noted that as the copper powder was obtained from the reduction of a mixture of CuCN and excess Cu, from the preceding precipitation steps, a part of the copper had been recycled several times.

B. The procedure of A was repeated with two mols of copper powder per mol of copper sulfate. The reaction was incomplete.

C. The procedure was the same as in B but the copper powder was obtained from the reduction with hydrogen of pure CuCN which did not contain any recycled Cu. Precipitation was complete in 35 minutes.

D. The procedure was the same as C but a smaller amount of copper powder, 1.75 mols per mol of copper sulfate, was used. The precipitation of cuprous cyanide was complete after 65 minutes.

E. The procedure was the same as in C and D, but the amount of copper powder was further reduced to 1.5 mols per mol of copper sulfate. Precipitation was incomplete even after several hours.

F. This test used the same amount of copper powder as in test E but the copper powder had been reduced from cuprous cyanide in the powder form, the cuprous cyanide never having been briquetted. Precipitation was complete in 35 minutes.

G. The copper powder in this test was obtained by reduction of powdered CuCN as in test F. However, the CuCN was not pure CuCN but contained copper metal from previous precipitation. Precipitation was still incomplete at two hours. However, by adding an additional ¼ mol of copper powder the precipitation was completed in an additional 10 minutes.

H. This test is similar to test D, but the copper powder was obtained from the U.S. Bronze Powder Company, being electrolytic dendritic copper powder 99.4 to 99.8% Cu, density 0.9 to 1.1 gms./cc. and having the following screen analysis:

| | Percent |
|---|---|
| —100 mesh | 100 |
| —200 mesh | 80–90 |
| —325 mesh | 50–75 |

Precipitation was not complete at 95 minutes, but the addition of 1 more mol of copper per mol of copper sulfate permitted the precipitation to go to completion after 215 minutes.

I. The same copper powder was used in H but a larger amount, 3 mols per mol of copper sulfate, was employed. The reaction went to completion in 35 minutes.

Tests H and I show that copper powder obtained by the reduction of cuprous cyanide, particularly when the reduction took place in powder form, is considerably more reactive than ordinary copper powder obtainable commercially.

The invention has been described in connection with obtaining substantially pure copper from impure leach liquors, which is its most important single field at the present time. However, the process may be used for refining impure copper, such as black copper, copper containing scrap and the like. Also, copper sulfate has been described more particularly as the preferred form of copper salt in the first step.

It is an advantage of the present invention that the rate at which hydrogen is used in the step of reducing cuprous cyanide to metallic copper is not particularly critical. Typical rates have been described in some of the examples. About the only limitation is that the hydrogen must be in excess and flow at a reasonable rate so that substantial amounts of cyanogen or other products do not result. The exact rate of hydrogen introduction and the exact amount of excess is not critical and depends to some extent on temperature and particle size of the cuprous cyanide. In general, since the unused hydrogen is recycled, it is desirable to provide a sufficient excess and a sufficiently rapid rate to be sure that there will be no widespread side reactions, as the cost of recycling excess hydrogen is comparatively low.

I claim:
1. A process of recovering substantially pure copper from an aqueous soltuion of a copper salt having a substantially non-reactive anion which also does not substantially solubilize CuCN, which comprises,
    (a) reacting the solution with hydrogen cyanide and a reducing agent capable of reducing cupric salts to cuprous salts, the reaction taking place under acid conditions,
    (b) recovering precipitated cuprous cyanide, and
    (c) reducing the cuprous cyanide with hydrogen at elevated temperatures from 190° to 600° C. to form copper metal and hydrogen cyanide, the amount and rate of hydrogen introduction being sufficiently high to prevent substantial decomposition of the hydrogen cyanide produced.
2. A process according to claim 1 in which the reduction of the cuprous cyanide with hydrogen is effected at temperatures from 300° to 450° C.
3. A process according to claim 2 in which the copper salt is copper sulfate.
4. A process according to claim 1 in which the copper salt is copper sulfate.
5. A process according to claim 1 in which the reducing agent is sulfur dioxide.
6. A process according to claim 5 in which the hydrogen cyanide in step (a) is in substantial excess.
7. A process according to claim 1 in which the reducing agent is copper.
8. A process according to claim 7 in which a portion of the copper produced by the hydrogen reduction of cuprous cyanide is recycled as the copper reducing agent in the cuprous cyanide precipitation.
9. A process according to claim 2 in which the reducing agent is copper.
10. A process according to claim 9 in which a portion of the copper produced by the hydrogen reduction of cuprous cyanide is recycled at the copper reducing agent in the cuprous cyanide precipitation step.
11. A process according to claim 3 in which the reducing agent is copper.
12. A process according to claim 11 in which a portion of the metallic copper produced by the hydrogen reduction of cuprous cyanide is recycled at the metallic copper reducing agent in the cuprous cyanide precipitation step.
13. A process according to claim 4 in which the reducing agent is copper.
14. A process according to claim 13 in which a portion of the copper produced by the hydrogen reduction of cuprous cyanide is recycled as the copper reducing agent in the cuprous cyanide precipitation step.
15. A process for producing essentially pure cuprous cyanide from an acid aqueous copper salt solution containing significant amounts of impurities in the form of soluble salts of polyvalent metals, the anion of the copper salt being substantially non-reactive and also does not substantially solubilize CuCN, which comprises reacting the acid solution with hydrogen cyanide and a reducing agent capable of reducing cupric salts to cuprous salts, to precipitate a major portion of the copper present as essentially

17 pure cuprous cyanide and separating the cuprous cyanide thus precipitated.

16. A process according to claim 15 in which the cupric salt is copper sulfate.

17. A process according to claim 15 in which the reducing agent is copper.

18. A process according to claim 16 in which the reducing agent is copper.

19. A process according to claim 15 in which the reducing agent is sulfur dioxide and thus reaction produces sulfuric acid.

20. A process according to claim 16 in which the reducing agent is sulfur dioxide and thus reaction produces sulfuric acid.

21. A process according to claim 3 in which the copper sulfate is produced by leaching copper containing material.

22. A process according to claim 4 in which the copper sulfate is produced by leaching copper containing material.

23. A process according to claim 16 in which the copper sulfate is produced by leaching copper containing material.

18

24. A process of reducing cuprous cyanide to metallic copper which comprises passing a hydrogen containing gas through the cuprous cyanide at temperatures from 190° to 600° C., the amount and rate of hydrogen introduction being sufficiently high to prevent substantial decomposition of HCN formed in the reaction.

25. A process according to claim 24 in which the temperature is 300°–450° C.

References Cited by the Examiner
UNITED STATES PATENTS

| | | | |
|---|---|---|---|
| 1,068,646 | 7/1913 | Gitsham | 75—105 |
| 1,178,081 | 4/1916 | Layng | 75—105 |
| 1,461,918 | 7/1923 | Laist | 75—108 |
| 1,654,918 | 1/1928 | Buchanan et al. | 75—106 |
| 1,658,249 | 2/1928 | McCluskey | 75—106 |
| 1,992,060 | 2/1935 | Ewan et al. | 75—106 |
| 2,754,193 | 7/1956 | Graham et al. | 75—72 |
| 3,189,435 | 6/1965 | Lower | 75—106 |

DAVID L. RECK, *Primary Examiner.*

N. MARKVA, *Assistant Examiner.*